(12) United States Patent
Suyama et al.

(10) Patent No.: US 8,574,772 B2
(45) Date of Patent: Nov. 5, 2013

(54) SOLID ELECTROLYTE, SOLID ELECTROLYTE SHEET, AND METHOD FOR PRODUCING SOLID ELECTROLYTE

(75) Inventors: Hiroshi Suyama, Mishima (JP); Koji Kawamoto, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 19 days.

(21) Appl. No.: 13/059,873

(22) PCT Filed: Jul. 17, 2009

(86) PCT No.: PCT/JP2009/062967
§ 371 (c)(1),
(2), (4) Date: Feb. 18, 2011

(87) PCT Pub. No.: WO2011/007445
PCT Pub. Date: Jan. 20, 2011

(65) Prior Publication Data
US 2012/0100433 A1     Apr. 26, 2012

(51) Int. Cl.
*H01M 6/18*     (2006.01)

(52) U.S. Cl.
USPC .......................... 429/304; 429/306; 429/322

(58) Field of Classification Search
None
See application file for complete search history.

(56) References Cited

U.S. PATENT DOCUMENTS

| | | | |
|---|---|---|---|
| 2003/0232248 A1* | 12/2003 | Iwamoto et al. | 429/233 |
| 2006/0063051 A1* | 3/2006 | Jang | 429/29 |
| 2007/0048617 A1* | 3/2007 | Inda | 429/304 |
| 2007/0148553 A1 | 6/2007 | Weppner | |
| 2008/0220334 A1 | 9/2008 | Inda | |
| 2009/0162755 A1* | 6/2009 | Neudecker | 429/319 |

FOREIGN PATENT DOCUMENTS

| JP | A-2004-95342 | 3/2004 |
|---|---|---|
| JP | A-2006-164783 | 6/2006 |
| JP | A-2007-528108 | 10/2007 |
| JP | A-2008-21416 | 1/2008 |
| JP | A-2008-112661 | 5/2008 |

OTHER PUBLICATIONS

Murugan et al., "Fast Lithium Ion Conduction in Garnet-Type $Li_7La_3Zr_2O_{12}$," Agnew. Chem. Int. Ed., 2007, pp. 7778-7781, vol. 46.
International Search Report mailed Aug. 25, 2009 issued in International Patent Application No. PCT/JP2009/062967 (with translation).

* cited by examiner

*Primary Examiner* — Patrick Ryan
*Assistant Examiner* — Jose Colucci Rios
(74) *Attorney, Agent, or Firm* — Oliff & Berridge, PLC

(57) ABSTRACT

The main object of the present invention is to provide a solid electrolyte with intergranular resistance decreased.

The present invention solves the above-mentioned problem by providing a solid electrolyte comprising a garnet-type compound with Li ion conductivity as the main component, characterized in that a phosphate group-containing Li ion conductor is provided between particles of the above-mentioned garnet-type compound, and the phosphate group-containing Li ion conductor has a smaller particle diameter than a particle diameter of the above-mentioned garnet-type compound and makes face contact with the above-mentioned garnet-type compound.

7 Claims, 2 Drawing Sheets

SOLID ELECTROLYTE, SOLID ELECTROLYTE SHEET, AND METHOD FOR PRODUCING SOLID ELECTROLYTE

TECHNICAL FIELD

The present invention relates to a solid electrolyte with intergranular resistance decreased, a solid electrolyte sheet and a method for producing the solid electrolyte.

BACKGROUND ART

In accordance with a rapid spread of information related apparatuses and communication apparatuses such as a personal computer, a video camera and a portable telephone in recent years, the development of a battery to be utilized as a power source thereof has been emphasized. The development of a high-output and high-capacity battery for an electric vehicle or a hybrid automobile has been advanced also in the technical field such as the automobile industry. A lithium battery has been presently receiving attention from the viewpoint of a high energy density among various kinds of batteries.

Organic liquid electrolyte having a flammable organic solvent as a solvent thereof is used for a presently commercialized lithium battery, so that the installation of a safety device for restraining temperature rise during a short circuit and the improvement in structure and material for preventing the short circuit are necessary therefor. On the contrary, with regard to an all solid lithium battery all-solidified by replacing the liquid electrolyte with a solid electrolyte, the flammable organic solvent is not used in the battery. Accordingly, the simplification of the safety device is promoted and thereby the battery attains excellent production cost and productivity.

An oxide solid electrolyte has been known as an example of such a solid electrolyte. With regard to the oxide solid electrolyte, $Li_7La_3Zr_2O_{12}$ as a garnet-type compound is disclosed in Nonpatent Document 1, for example. Since $Li_7La_3Zr_2O_{12}$ has high in Li ion conductivity as bulk, it is effective for achieving higher output of a battery. The garnet-type compound (a solid ion conductor) is disclosed also in Patent Document 1. On the other hand, it is described in Patent Document 2 that the flexibility of a solid electrolyte layer is secured by adding an organic polymer compound into the solid electrolyte layer.

PRIOR ART DOCUMENT

Patent Document

Patent Document 1: Japanese Patent Application National Publication No. 2007-528108
Patent Document 2: Japanese Patent Application Laid-Open No. 2004-95342

Nonpatent Document

Nonpatent Document 1: Ramaswamy Murugan et al., "Fast Lithium Ion Conduction in Garnet-Type $Li_7La_3Zr_2O_{12}$", Angew. Chem. Int. Ed. 2007, 46, 7778-7781

DISCLOSURE OF THE INVENTION

Problems to be Solved by the Invention

The improvement of Li ion conductivity of a solid electrolyte has been conventionally requested. The garnet-type compound ($Li_7La_3Zr_2O_{12}$) described in Nonpatent Document 1 has a problem that its particle is so hard despite high Li ion conductivity as bulk that the particles may only make point contact with each other to increase intergranular resistance. The present invention has been made in view of the above-mentioned problem, and the main object thereof is to provide a solid electrolyte with intergranular resistance decreased.

Means for Solving the Problem

To achieve above-described object, the present invention provides a solid electrolyte comprising a garnet-type compound with Li ion conductivity as a main component; characterized in that a phosphate group-containing Li ion conductor is provided between particles of the garnet-type compound, and the phosphate group-containing Li ion conductor has a smaller particle diameter than a particle diameter of the garnet-type compound and makes face contact with the garnet-type compound.

According to the present invention, intergranular resistance may be decreased by providing a phosphate group-containing Li ion conductor, so soft as to be capable of being plastically deformed, between the hard particles of the garnet-type compound.

According to the present invention, a content of the phosphate group-containing Li ion conductor is preferably less than 19% by volume and within a range of 2% by volume to 16% by volume. The reason therefor is that a solid electrolyte excellent in Li ion conductivity as a whole may be obtained.

According to the present invention, the garnet-type compound is preferably $Li_7La_3Zr_2O_{12}$ because it is excellent in Li ion conductivity as bulk.

According to the present invention, the phosphate group-containing Li ion conductor is preferably $Li_3PO_4$ because it is plastically deformed so easily and is capable of sufficiently making face contact with the garnet-type compound.

In the present invention, provided is a solid electrolyte sheet comprising a substrate made of a polymer fiber, and a solid electrolyte portion formed in a void of the substrate; characterized in that the solid electrolyte portion is composed of the solid electrolyte explained above.

According to the present invention, the use of a substrate made of polymer fibers provides a solid electrolyte sheet excellent in flexibility.

In the present invention, provided is a method for producing a solid electrolyte having a garnet-type compound with Li ion conductivity as a main component, comprising the steps of: mixing the garnet-type compound and a phosphate group-containing Li ion conductor having a smaller particle diameter than a particle diameter of the garnet-type compound to obtain a raw material composition; and pressing the raw material composition and plastically deforming the phosphate group-containing Li ion conductor to provide the phosphate group-containing Li ion conductor, making face contact with the garnet-type compound, between particles of the garnet-type compound.

According to the present invention, the combination of the garnet-type compound and the phosphate group-containing Li ion conductor provides a solid electrolyte with intergranular resistance decreased.

Effect of the Invention

The present invention produces the effect of providing a solid electrolyte with intergranular resistance decreased.

BEST MODE FOR CARRYING OUT THE INVENTION

A solid electrolyte, a solid electrolyte sheet and a method for producing the solid electrolyte of the present invention are hereinafter described in detail.

A. Solid Electrolyte

A solid electrolyte of the present invention is first described. The solid electrolyte of the present invention comprises a garnet-type compound with Li ion conductivity as the main component, characterized in that a phosphate group-containing Li ion conductor is provided between particles of the garnet-type compound, and the phosphate group-containing Li ion conductor has a smaller particle diameter than a particle diameter of the above-mentioned garnet-type compound and makes face contact with the above-mentioned garnet-type compound.

According to the present invention, intergranular resistance may be decreased by providing the phosphate group-containing Li ion conductor, so soft as to be capable of being plastically deformed, between the hard particles of the garnet-type compound. In the present invention, a solid electrolyte with intergranular resistance decreased may be obtained by combining a garnet-type compound, which is high in Li ion conductivity and wide in potential window though hard, and a phosphate group-containing Li ion conductor, which is soft and wide in potential window though not high in Li ion conductivity. In addition, a solid electrolyte excellent in Li ion conductivity as a whole may be obtained by determining the content of the phosphate group-containing Li ion conductor within a predetermined range. The Li ion conductivity as a whole indicates a consideration of both Li ion conductivity as bulk and Li ion conductivity between particles. Although the performance of burning has been conventionally known for decreasing intergranular resistance, burning does not need to be performed in the present invention. As a result, the decrease of production costs and the improvement of workability may be attained.

The garnet-type compound and the phosphate group-containing Li ion conductor in the present invention are oxide solid electrolytes, for example. Such inorganic compounds are generally so hard that it is assumed that even a combination of both does not contribute to the decrease of intergranular resistance. On the contrary, the present invention pays attention that the phosphate group-containing Li ion conductor has such softness as to be capable of being plastically deformed and to attain the decrease of intergranular resistance.

Figure 1:
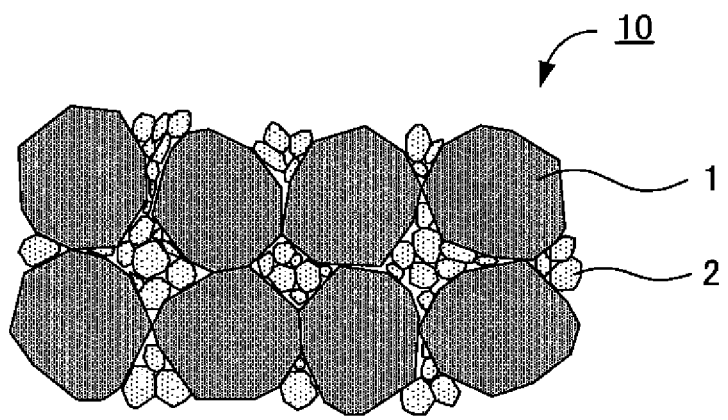
FIG. 1 is a schematic cross-sectional view showing an example of a solid electrolyte of the present invention.

FIG. 1 is a schematic cross-sectional view showing an example of a solid electrolyte of the present invention. A solid electrolyte 10 shown in FIG. 1 comprises a garnet-type compound 1 with Li ion conductivity as the main component, in which a phosphate group-containing Li ion conductor 2 is provided between particles of the garnet-type compound 1, and the phosphate group-containing Li ion conductor 2 has a smaller particle diameter than that of the garnet-type compound 1 and makes face contact with the garnet-type compound 1. The phosphate group-containing Li ion conductor 2 is generally softer than the garnet-type compound 1 and is easily deformed plastically by the after-mentioned pressing step. Thus, the phosphate group-containing Li ion conductor 2 is provided so as to fill in a gap between particles of the garnet-type compound 1, and consequently intergranular resistance of the garnet-type compound 1 may be decreased.

The solid electrolyte of the present invention is hereinafter described in each constitution.

1. Garnet-type Compound

A garnet-type compound in the present invention is first described. The garnet-type compound in the present invention is an oxide solid electrolyte with Li ion conductivity.

Here, a compound having a garnet-type crystal structure is generally a compound represented by $A_3B_2(SiO_4)_3$. In this crystal structure, A and B are 6-coordinated to 8-coordinated cations. Individual $SiO_4$ tetrahedron bonds mutually to B cation between lattices by an ionic bond. On the other hand, it has been known that a conventionally known compound represented by $Li_5La_3M_2O_{12}$ (M=Nb, Ta) also has a similar crystal structure to the ideal garnet-type crystal structure (refer to Japanese Patent Application National Publication No. 2007-528108). In the present invention, such a compound with Li ion conductivity is referred to as the garnet-type compound.

Examples of the garnet-type compound include a compound represented by $Li_{3+x}A_yG_zM_{2-v}B_vO_{12}$ (occasionally referred to as compound (I) hereinafter). Here, A, G, M and B are metal cations. For x, x preferably satisfies $0 \leq x \leq 5$ and more preferably satisfies $4 \leq x \leq 5$. For y, y preferably satisfies $0 \leq y \leq 3$ and more preferably satisfies $0 \leq y \leq 2$. For z, z preferably satisfies $0 \leq z \leq 3$ and more preferably satisfies $1 \leq z \leq 3$. For v, v preferably satisfies $0 \leq v \leq 2$ and more preferably satisfies $0 \leq v \leq 1$. For O, O may be substituted partially or entirely with a divalent anion and/or a trivalent anion, such as $N^{3-}$.

In the compound (I), A is preferably an alkaline earth metal cation such as Ca, Sr, Ba and Mg, or a transition metal cation such as Zn. Further, G is preferably a transition metal cation such as La, Y, Pr, Nd, Sm, Lu and Eu. Examples of M include a transition metal cation such as Zr, Nb, Ta, Bi, Te and Sb. Also, B is preferably In, for example. In the present invention, M is preferably Zr. In particular, in the present invention, the garnet-type compound is preferably $Li_7La_3Zr_2O_{12}$ because it is excellent in Li ion conductivity as bulk.

The garnet-type compound in the present invention is generally particulate. The average particle diameter of the garnet-type compound is preferably within a range of 0.01 μm to 100 μm, for example, and more preferably within a range of 0.1 μm to 10 μm. The average particle diameter may be calculated by a Coulter counter (a particle size distribution meter). The reason therefor is that the above-mentioned range allows favorable Li ion conductivity to be performed. The garnet-type compound generally has a harder property than the after-mentioned phosphate group-containing Li ion conductor. The hardness of the garnet-type compound may be evaluated by a compression tester (such as MCT-W500™ manufactured by Shimadzu Corporation). Specifically, particle fracture hardness (a measurement particle diameter of 5 μm) is preferably within a range of 100 MPa to 2000 MPa, for example, more preferably within a range of 300 MPa to 2000 MPa, and even more preferably within a range of 500 MPa to 2000 MPa. The garnet-type compound is preferably excellent in Li ion conductivity as bulk. Li ionic conduction as bulk is preferably $10^{-6}$ S/cm or more, and more preferably $10^{-4}$ S/cm or more, for example. The garnet-type compound in the present invention may be synthesized by a solid phase method, for example.

2. Phosphate Group-containing Li Ion Conductor

Next, a phosphate group-containing Li ion conductor in the present invention is described. The phosphate group-containing Li ion conductor in the present invention is generally a compound having Li element and a phosphate group ($PO_4$ skeleton). Examples of the phosphate group-containing Li ion conductor include an oxide solid electrolyte with Li ion conductivity.

Examples of the phosphate group-containing Li ion conductor include a compound represented by $Li_{3-x}PO_{4-y}$ (occasionally referred to as compound (II) hereinafter). Here, x preferably satisfies $0 \le x < 3$ and y preferably satisfies $0 \le y < 4$. In particular, in the present invention, the compound (II) is preferably $Li_3PO_4$.

Other examples of the phosphate group-containing Li ion conductor include a compound having NASICON (LISICON)-type structure. Examples of the compound having NASICON (LISICON)-type structure include a compound represented by $Li_aX_bY_cP_dO_e$ (X is at least one kind selected from the group consisting of Ti, Zr, Ge, In, Ga, Sn and Al, Y is at least one kind selected from the group consisting of B, Al, Ga, In, C, Si, Ge, Sn, Sb and Se; a to e satisfy the relations of $0.5 < a < 5.0$, $0.5 \le b < 3.0$, $0 \le c < 2.98$, $0.02 < d \le 3.0$, $2.0 < c+d < 4.0$ and $3.0 < e \le 12.0$) (occasionally referred to as compound (III) hereinafter). In particular, in the present invention, $Li_aTi_bAl_gP_dO_e$ or $Li_aTi_bSi_cP_dO_e$ is preferable.

Other examples of the phosphate group-containing Li ion conductor include a compound containing nitrogen. Examples of the phosphate group-containing Li ion conductor containing nitrogen include a compound represented by $Li_{3-x}PO_{4-y}N_z$ (occasionally referred to as compound (IV) hereinafter). Here, x preferably satisfies $0 \le x < 3$, y preferably satisfies $0 \le y < 4$ and z preferably satisfies $0 < z \le 4$. The compound (IV) may be obtained by nitriding the compound (II), for example.

Other examples of the phosphate group-containing Li ion conductor containing nitrogen include a compound containing nitrogen and having NASICON (LISICON)-type structure. Examples of such a compound include a compound represented by $Li_aX_bY_cP_dO_eN_f$ (X is at least one kind selected from the group consisting of Ti, Zr, Ge, In, Ga, Sn and Al; Y is at least one kind selected from the group consisting of B, Al, Ga, In, C, Si, Ge, Sn, Sb and Se; a to f satisfy the relations of $0.5 < a < 5.0$, $0.5 \le b < 3.0$, $0 \le c < 2.98$, $0.02 < d \le 3.0$, $2.0 < c+d < 4.0$, $3.0 < e \le 12.0$ and $0.002 < f < 2.0$) (occasionally referred to as compound (V) hereinafter). In particular, in the present invention, $Li_aTi_bAl_cP_dO_eN_f$ or $Li_aTi_bSi_cP_dO_eN_f$ is preferable. The compound (V) may be obtained by nitriding the compound (III), for example.

Examples of a synthesis method for the phosphate group-containing Li ion conductor containing nitrogen include a method such that a compound in a state before being nitrided (a raw material compound) and urea as a nitriding agent are mixed and heat-treated. In this case, the degree of nitriding may be adjusted by the amount of the nitriding agent. For example, in the case of obtaining the above-mentioned compound (IV), $Li_3PO_4$ may be used as the raw material compound. In addition, a compound having an adjacent composition of $Li_3PO_4$ may be synthesized in such a manner that $Li_2CO_3$ and $(NH_4)H_2PO_4$ are mixed by predetermined amounts and subjected to mechanical milling. The temperature of thermal treatment is generally a temperature higher than decomposition temperature of the nitriding agent, and is preferably within a range of 100° C. to 800° C., for example. The time for thermal treatment is preferably within a range of 10 minutes to 5 hours, for example. In addition, the atmosphere in burning is not particularly limited: examples thereof include air atmosphere; inert gas atmosphere such as nitrogen atmosphere and argon atmosphere; reducing atmosphere such as ammonia atmosphere and hydrogen atmosphere; and vacuum, and above all, inert gas atmosphere, reducing atmosphere and vacuum are preferable, and particularly, reducing atmosphere is preferable. The reason therefor is that oxidative degradation of an obtained compound may be prevented.

The phosphate group-containing Li ion conductor containing nitrogen is not such that N is simply adsorbed in the raw material compound but preferably such that N exists in the phosphate group-containing Li ion conductor while chemically bonded.

The phosphate group-containing Li ion conductor in the present invention is generally particulate. The average particle diameter of the phosphate group-containing Li ion conductor is preferably within a range of 0.01 μm to 100 μm, and more preferably within a range of 0.01 μm to 10 μm, for example. A calculating method for the average particle diameter is the same as the case of the garnet-type compound. In the present invention, the phosphate group-containing Li ion conductor is generally provided between particles of the garnet-type compound, so that the particle diameter thereof becomes smaller than the particle diameter of the garnet-type compound.

The phosphate group-containing Li ion conductor generally has a softer property than the above-mentioned garnet-type compound. The hardness of the phosphate group-containing Li ion conductor may be evaluated by a compression tester (such as MCT-W500™ manufactured by Shimadzu Corporation). Specifically, particle fracture hardness (a measurement particle diameter of 5 μm) is preferably, for example, within a range of 0.001 MPa to 500 MPa and within a range of 0.001 MPa to 300 MPa, above all. The phosphate group-containing Li ion conductor is preferably excellent in Li ion conductivity as bulk. Li ionic conduction as bulk is preferably $10^{-9}$ S/cm or more and more preferably $10^{-6}$ S/cm or more, for example.

3. Solid Electrolyte

A solid electrolyte of the present invention has the above-mentioned garnet-type compound and phosphate group-containing Li ion conductor. In addition, this solid electrolyte has the garnet-type compound as the main component. Here, "the garnet-type compound as the main component" indicates that the content of the garnet-type compound in the solid electrolyte is 50% by volume or more; preferably 80% by volume or more, and more preferably within a range of 80% by volume to 99% by volume. The reason therefor is that too small content of the garnet-type compound brings a possibility of decreasing Li ion conductivity as a whole, while too large content of the garnet-type compound brings a possibility of not being sufficiently capable of decreasing intergranular resistance.

In the present invention, the content of the phosphate group-containing Li ion conductor in the solid electrolyte is preferably such an amount as to fill in a gap between particles of the garnet-type compound. The reason therefor is to provide the solid electrolyte with intergranular resistance decreased, excellent in Li ion conductivity as a whole. The content of the phosphate group-containing Li ion conductor is preferably 50% by volume or less, more preferably less than 19% by volume, far more preferably 18% by volume or less, and particularly preferably 16% by volume or less. The reason therefor is that too large content of the phosphate group-containing Li ion conductor brings a possibility of decreasing Li ion conductivity as a whole. On the other hand, the content of the phosphate group-containing Li ion conductor in the solid electrolyte is preferably 2% by volume or more, more preferably 4% by volume or more, and far more preferably 6% by volume or more. The reason therefor is that too small content of the phosphate group-containing Li ion conductor brings a possibility of not being sufficiently capable of decreasing intergranular resistance.

The solid electrolyte of the present invention may comprise only the above-mentioned garnet-type compound and phosphate group-containing Li ion conductor, or further may comprise other components.

Examples of the shape of the solid electrolyte of the present invention include pellets. The thickness of the pellet-shaped solid electrolyte varies with the use of the solid electrolyte, and is preferably 0.01 μm or more, more preferably 0.1 μm or more, and even more preferably 1 μm or more, for example. The reason therefor is that too small thickness of the solid electrolyte easily causes a short circuit due to dendrite penetration. On the other hand, the thickness of the pellet-shaped solid electrolyte is preferably 1000 μm or less, more preferably 100 μm or less, and even more preferably 30 μm or less, for example. The reason therefor is that too large thickness of the solid electrolyte brings a possibility of decreasing the capacity of a battery.

Examples of the use of the solid electrolyte of the present invention include a solid electrolyte layer of a lithium battery. That is to say, the present invention may provide an all solid lithium battery characterized by comprising a solid electrolyte layer using the above-mentioned solid electrolyte. The solid electrolyte of the present invention may be also used as a separator layer of a lithium battery using liquid electrolyte. In this case, a very small hole of the solid electrolyte effectively restrains a short circuit caused by dendrite penetration.

B. Solid Electrolyte Sheet

Next, a solid electrolyte sheet of the present invention is described. The solid electrolyte sheet of the present invention comprises a substrate made of polymer fibers, and a solid electrolyte portion formed in a void of the above-mentioned substrate, characterized in that the above-mentioned solid electrolyte portion is composed of the above-mentioned solid electrolyte.

According to the present invention, the use of the substrate made of polymer fibers provides the solid electrolyte sheet excellent in flexibility.

Figure 2:
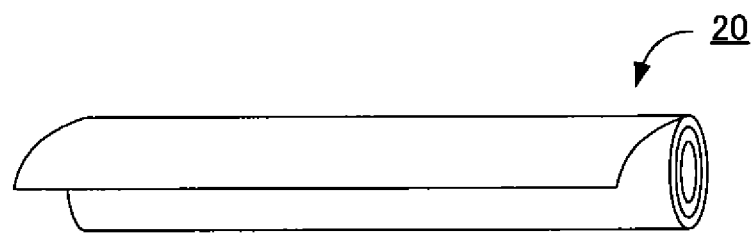
FIG. 2 is a schematic perspective view showing an example of a solid electrolyte sheet of the present invention.

FIG. 2 is a schematic perspective view showing an example of a solid electrolyte sheet of the present invention. A solid electrolyte sheet 20 shown in FIG. 2 comprises a substrate made of polymer fibers, and a solid electrolyte portion formed so as to fill in a void of the substrate. In addition, the solid electrolyte portion is composed of the solid electrolyte described in the above-mentioned "A. solid electrolyte". The solid electrolyte sheet 20 becomes a sheet capable of being rolled up by reason of having the substrate made of polymer fibers.

The substrate in the present invention is made of polymer fibers. Examples of the above-mentioned polymer fibers include polyacrylonitrile, polyester, polyimide, polyamide, polytetrafluoroethylene and polyolefin. The voltage of the above-mentioned substrate is not particularly limited; preferably 80% or less and more preferably 30% or less, for example. In addition, the thickness of the above-mentioned substrate is preferably within a range of 0.01 μm to 100 μm and more preferably within a range of 1 μm to 100 μm, for example, The solid electrolyte portion in the present invention is formed in a void of the substrate and preferably formed so as to fill in a void of the substrate. The reason therefor is to be useful as the after-mentioned separator layer-forming sheet, for example. The solid electrolyte portion may be formed at least in a void of the substrate, or formed further on a surface (one face or both faces) of the substrate. In addition, the solid electrolyte portion may contain a binder for improving adhesion properties. Examples of the binder include a fluorine-containing polymer such as PTFE.

Examples of the use of the solid electrolyte sheet of the present invention include a solid electrolyte layer-forming sheet of a lithium battery. That is to say, the present invention may provide an all solid lithium battery characterized by comprising a solid electrolyte layer using the above-mentioned solid electrolyte sheet. The solid electrolyte sheet of the present invention may be also used as a separator layer-forming sheet of a lithium battery using a liquid electrolyte. In this case, a very small hole of the solid electrolyte effectively restrains a short circuit caused by dendrite penetration. Examples of a method for producing the solid electrolyte sheet of the present invention include a method comprising steps of: coating a raw material composition, in which the garnet-type compound and the phosphate group-containing Li ion conductor are mixed, and pressing the resultant to the substrate made of polymer fibers.

C. Method for Producing Solid Electrolyte

Next, a method for producing a solid electrolyte of the present invention is described. The method for producing a solid electrolyte of the present invention is a method for producing a solid electrolyte having a garnet-type compound with Li ion conductivity as the main component, comprising the steps of: mixing the above-mentioned garnet-type compound and a phosphate group-containing Li ion conductor having a smaller particle diameter than a particle diameter of the above-mentioned garnet-type compound to obtain a raw material composition, and pressing the above-mentioned raw material composition and plastically deforming the above-mentioned phosphate group-containing Li ion conductor to provide the above-mentioned phosphate group-containing Li ion conductor, making face contact with the above-mentioned garnet-type compound, between particles of the above-mentioned garnet-type compound.

According to the present invention, the solid electrolyte with intergranular resistance decreased may be obtained by combining the garnet-type compound and the phosphate group-containing Li ion conductor.

Figure 3A:
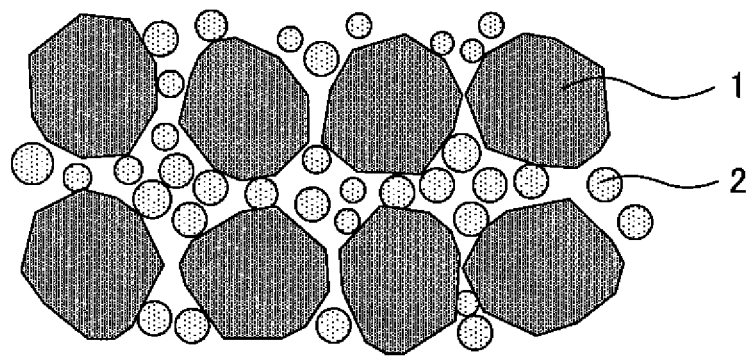
FIGS. 3A and 3B are each a schematic cross-sectional view showing an example of a method for producing a solid electrolyte of the present invention.
Figure 3B:
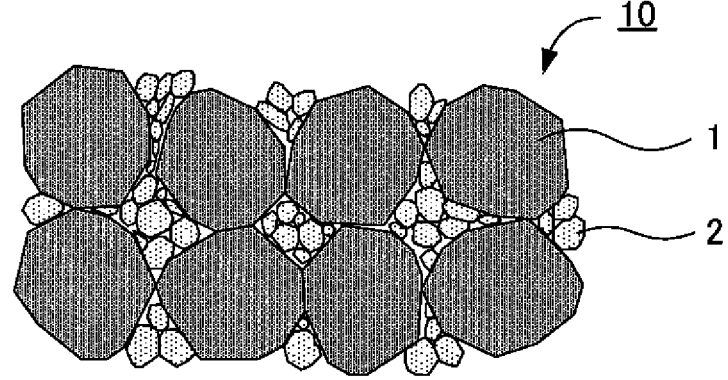

FIGS. 3A and 3B are each a schematic cross-sectional view showing an example of the method for producing the solid electrolyte of the present invention. In the producing method shown in FIGS. 3A and 3B, a garnet-type compound 1 with Li ion conductivity and a phosphate group-containing Li ion conductor 2 smaller than the garnet-type compound are first mixed at a predetermined ratio to obtain a raw material composition (FIG. 3A). Next, the raw material composition is pressed and the soft phosphate group-containing Li ion conductor 2 is plastically deformed, whereby the phosphate group-containing Li ion conductor 2 making face contact with the garnet-type compound 1 is provided between particles of the garnet-type compound 1 (FIG. 3B). Thus, the solid electrolyte 10 such that the phosphate group-containing Li ion conductor 2 is formed so as to fill in a gap between particles of the garnet-type compound 1 is obtained.

The method for producing the solid electrolyte of the present invention is hereinafter described in each step.

1. Mixing Step

The mixing step in the present invention is a step of mixing the garnet-type compound and the phosphate group-containing Li ion conductor having a smaller particle diameter than the above-mentioned garnet-type compound to obtain the raw material composition. The garnet-type compound and the phosphate group-containing Li ion conductor used for the present invention are the same as the contents described in the above-mentioned "A. Solid electrolyte", so that the description herein is omitted. The used amounts of the garnet-type compound and the phosphate group-containing Li ion conductor are also the same as the above-mentioned contents. In particular, in the present invention, the content of the phosphate group-containing Li ion conductor in the raw material composition is preferably less than 19% by volume. The reason therefor is to provide the solid electrolyte excellent in Li ion conductivity as a whole.

2. Pressing Step

The pressing step in the present invention is a step of pressing the above-mentioned raw material composition and plastically deforming the above-mentioned phosphate group-containing Li ion conductor to provide the above-mentioned phosphate group-containing Li ion conductor, making face contact with the above-mentioned garnet-type compound, between particles of the above-mentioned garnet-type compound.

In the present invention, pressing is generally performed at a pressure more than a pressure for plastically deforming the phosphate group-containing Li ion conductor. The pressure in pressing varies depending on kinds of the phosphate group-containing Li ion conductor, and is preferably within a range of 1 Pa to 100 MPa and more preferably within a range of 1 MPa to 30 MPa, for example. The reason therefor is that too small pressure brings a possibility of not being sufficiently capable of decreasing intergranular resistance, while too large pressure brings a possibility of causing the break or the like of the garnet-type compound. The time for applying pressure is within a range of 1 minute to 30 minutes, for example. Examples of a method for pressing the raw material composition include a method by using a known pressing machine.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

The synthesis of a garnet-type compound was first performed. Specifically, $Li_7La_3Zr_2O_{12}$ an average particle diameter of 3 μm) was obtained by the same method as the method described in Ramaswamy Murugan et al., "Fast Lithium Ion Conduction in Garnet-Type $Li_7La_3Zr_2O_{12}$", Angew. Chem. Int. Ed. 2007, 46, 7778-7781. Next, $Li_3PO_4$ (an average particle diameter of 1 μm) was prepared as a phosphate group-containing Li ion conductor. Next, $Li_7La_3Zr_2O_{12}$ and $Li_3PO_4$ were mixed so that the content of $Li_3PO_4$ became 4.1% by volume to obtain a raw material composition. Next, the obtained raw material composition was disposed inside a ceramic cylindrical member with a diameter of 10 μm, and pressed on the pressure conditions of 1 ton to thereby obtain a pellet-shaped solid electrolyte.

Examples 2 to 6

A solid electrolyte was obtained in the same manner as Example 1 except for modifying the content of $Li_3PO_4$ into 8.1% by volume, 11.9% by volume, 15.5% by volume, 19.0% by volume and 34.6% by volume.

Comparative Examples 1 and 2

A solid electrolyte was obtained in the same manner as Example 1 except for modifying the content of $Li_3PO_4$ into 0% by volume and 100% by volume.

[Evaluations]

Impedance measurement was performed by using the solid electrolyte obtained in Examples 1 to 6 and Comparative Examples 1 and 2. The measurement conditions of impedance were a voltage amplitude of 30 mV, a measuring frequency of 0.1 MHz to 1 MHz, a measured temperature of 50° C. and a confining pressure of 6N. Li ionic conductance obtained by the impedance measurement is shown in Table 1 and FIG. 4.

TABLE 1

| | $Li_3PO_4$ added amount (% by volume) | Conductance (S/cm) |
|---|---|---|
| Comparative Example 1 | 0 | $1.12 \times 10^{-8}$ |
| Example 1 | 4.1 | $1.88 \times 10^{-7}$ |
| Example 2 | 8.1 | $1.77 \times 10^{-7}$ |
| Example 3 | 11.9 | $2.02 \times 10^{-7}$ |
| Example 4 | 15.5 | $1.92 \times 10^{-7}$ |
| Example 5 | 19.0 | $1.31 \times 10^{-7}$ |
| Example 6 | 34.6 | $9.73 \times 10^{-8}$ |
| Comparative Example 2 | 100 | $7.07 \times 10^{-8}$ |

Figure 4:
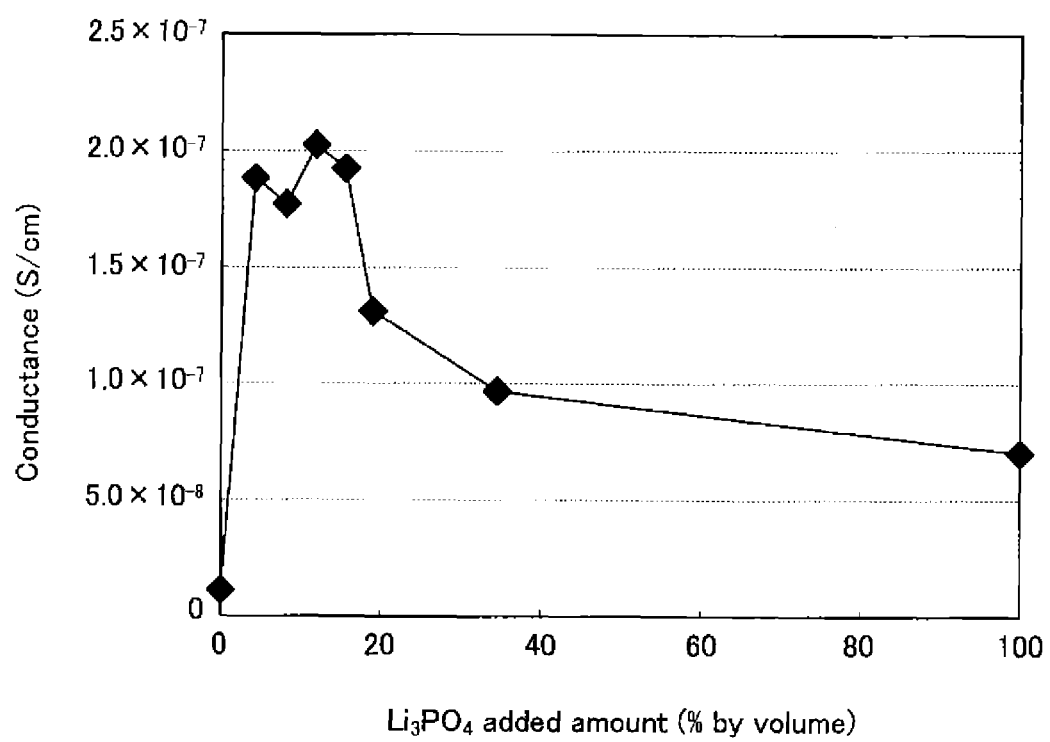
FIG. 4 is a graph showing Li ionic conductance obtained from impedance measurement.

As shown in Table 1 and FIG. 4, it was confirmed that Li ionic conductance as a whole was remarkably improved in the case where $Li_3PO_4$ (phosphate group-containing Li ion conductor) was less than 19.0% by volume.

REFERENCE NUMERALS

1: garnet-type compound
2: phosphate group-containing Li ion conductor
10: solid electrolyte
20: solid electrolyte sheet

The invention claimed is:

1. A solid electrolyte comprising a garnet-type compound with Li ion conductivity as a main component;
   wherein a phosphate group-containing Li ion conductor is provided between particles of the garnet-type compound, and
   the phosphate group-containing Li ion conductor has a smaller particle diameter than a particle diameter of the garnet-type compound and makes face contact with the garnet-type compound.

2. The solid electrolyte according to claim 1, wherein a content of the phosphate group-containing Li ion conductor is less than 19% by volume.

3. The solid electrolyte according to claim 1, wherein a content of the phosphate group-containing Li ion conductor is within a range of 2% by volume to 16% by volume.

4. The solid electrolyte according to claim 1, wherein the garnet-type compound is $Li_7La_3Zr_2O_{12}$.

5. The solid electrolyte according to claim 1, wherein the phosphate group-containing Li ion conductor is $Li_3PO_4$.

6. A solid electrolyte sheet comprising
   a substrate made of a polymer fiber, and
   a solid electrolyte portion formed in a void of the substrate, wherein the solid electrolyte portion is composed of the solid electrolyte according to claim 1.

7. A method for producing a solid electrolyte having a garnet-type compound with Li ion conductivity as a main component, comprising the steps of:

mixing the garnet-type compound and a phosphate group-containing Li ion conductor having a smaller particle diameter than a particle diameter of the garnet-type compound to obtain a raw material composition; and pressing the raw material composition and plastically deforming the phosphate group-containing Li ion conductor to provide the phosphate group-containing Li ion conductor, making face contact with the garnet-type compound, between particles of the garnet-type compound.

* * * * *